United States Patent [19]

Sawatzky et al.

[11] 3,770,395

[45] Nov. 6, 1973

[54] FERROMAGNETIC MATERIAL

[75] Inventors: Erich Sawatzky, San Jose; George Bryan Street, Palo Alto, both of Calif.

[73] Assignee: International Business Machines Corporation, Armonk, N.Y.

[22] Filed: Sept. 15, 1972

[21] Appl. No.: 289,512

Related U.S. Application Data

[63] Continuation-in-part of Ser. No. 202,642, Dec. 26, 1971, abandoned.

[52] U.S. Cl. .............. 29/194, 75/134 G, 75/134 M, 75/134 T

[51] Int. Cl. ........................ B32b 15/04, C22c 31/00

[58] Field of Search ...................... 75/134 T, 134 G, 75/134 M, 134 N

[56] References Cited

UNITED STATES PATENTS

| | | | |
|---|---|---|---|
| 3,065,071 | 11/1962 | Wernick | 75/134 G |
| 3,147,112 | 9/1964 | Bither | 75/134 T |
| 3,207,638 | 9/1965 | Bither | 75/134 M X |
| 3,676,867 | 7/1972 | Bacon et al. | 75/134 G X |

OTHER PUBLICATIONS

Shibata et al., J. Phys. Soc. Japan 32, 1431 (1972), "Magnetic Properties of a New Ferromagnetic Compound MnGaGe"

*Primary Examiner*—L. Dewayne Rutledge
*Assistant Examiner*—E. L. Weise
*Attorney*—Melvyn D. Silver et al.

[57] ABSTRACT

A room temperature stable ferromagnetic permanent magnet ternary intermetallic compound with a large Faraday rotation and having a Curie temperature in the region of substantially 75°–190°C having atomic proportions indicated by the formula:

$$Mn_{0.8-1.2}Ga_{0.6-1.3}Ge_{0.6-2.3}$$

In film form, the magnetization is normal to the film plane. Additionally, Al, B, In or Tl may be added to the film to lower the Curie temperature while still maintaining a tetragonal structure.

22 Claims, No Drawings

FERROMAGNETIC MATERIAL

The present application is a continuation-in-part of Application Ser. Number 202,642, filed Nov. 26, 1971, now abandoned, and is related to application Ser. No. 289,513 filed Sept. 15, 1972.

FIELD OF THE INVENTION

This invention relates to ferromagnetic films in general and ferromagnetic films in particular having low Curie point temperatures concurrent with high specific Faraday rotation.

PRIOR ART

Ferromagnetic materials utilizing the constituents MnAlGe are known in the prior art, as illustrated in U. S. Pat. 3,065,071, and discussed in the publication "Manganese Aluminum Germanium Films for Magneto-Optic Applications," by R. C. Sherwood, E. A. Nesbitt, J. H. Wernick, D. D. Bacon, A. J. Kurtzig and R. Wolfe, J. Appl. Phys. (March 1971). The above patent is directed toward compositions of the general formula $Mn_{0.8-1.2}Al_{0.8-1.2}Ge_{0.8-1.2}$ given in atomic proportions. It is noted in the above patents that departures from the basic composition disclosed results in excessive deficiencies in magnetic properties when the above formula is exceeded. However, for various applications the properties sought cannot be met within the compositions known in the prior art. Thus, the MnAlGe films disclosed while sufficient for permanent magnets as disclosed in the above patent, do not have the properties desired for many potential memory uses. An improved ferromagnetic film having a controllable Curie point in the region 180°–220°C is described in the copending application Ser. No. 202,604, filed Nov. 26, 1971, "Ferromagnetic Material," by K. Lee, E. Sawatzky, and J. C. Suits, and assigned to the assignee of this invention.

Potential memory use materials preferably have room temperature stability, and indeed should be stable over a wide temperature range in air. Further, these films should have a relatively low Curie point, which is also controllable as desired. Further, these films should have a high specific Faraday rotation, be easy to manufacture, and have a sufficient coercivity. The remanent rotations should also be close to that of saturation. Prior art films have not achieved this.

Thus, it is an object of this invention to provide a ferromagnetic material that is stable at room temperature and to approximately 600°C.

A further object is to maintain the Curie point of this material preferably between 75° and 190°C, for use in potential memory applications.

Still another object of this invention is the ability to make an easily manufactured film by a variety of techniques, the film being stable in air and having the above properties. Further, control of Curie point should be readily available.

Still another object is to still lower the Curie temperature of the above film by additive addition while maintaining the basic magnetic properties of the film.

Still another object is to maintain adequate magnetization and coercivity of the film.

Still another object is a magnetic memory structure employing the ferromagnetic composition of this invention.

SUMMARY OF THE INVENTION

These and other objects of the invention are met by the intermetallic compound consisting essentially of the following materials having atomic proportions indicated by the formula:

$$Mn_{0.8-1.2}Ga_{0.6-1.3}Ge_{0.6-2.3}$$

The properties of these compositions and preferred embodiments, including aluminum, iron, cobalt and nickel addition for lowering the Curie point of the compositions, are disclosed in the following general description.

GENERAL DESCRIPTION

We have found that a broad range of ferromagnetic compositions, all of which are ternary intermetallic compounds, having controllable properties can be made from MnGaGe. In the broadest sense, the properties described below are available from any atomic proportion combination of these elements so long as the tetragonal structure that characterizes this material is maintained.

The MnGaGe compositions described can be made by any of the known techniques in film form, for example in the region between 300–10,000 angstroms thick, by vacuum deposition and sputtering techniques. The grain size of these films is controlled between 0.5$\mu$ or less, to 20 microns by control of deposition temperature at the substrate to between 200°C and 500°C, and a deposition rate of between 1.5 A and 5 A/sec. Such grain size control techniques are known in the art.

Similarly, bulk MnGaGe can be made by melting the three elements together, and quenching, followed by annealing. These techniques again are known in the art.

Various modifications in the basic MnGaGe composition can be usefully employed without changing the important ferro-magnetic characteristics of the material. The compositions below have the general properties of being stable in air to about 425°C, or higher, and in a controlled atmosphere to about 600°C, depending upon the exact composition. Indeed, since control of Curie temperature is a fundamental concern, various departures from stoichiometry are deliberately desired. This results in various elements being deficient in the structure, but to a controlled and desired purpose. Thus, we have found that the composition range expressed in the atomic proportions of the elements that gives us the desired properties is:

EXAMPLE I $$Mn_{0.8-1.2}Ga_{0.8-1.2}Ge_{0.8-1.2}$$

Compositions having this formula range exhibit the following properties:

1. Curie point: 75°–190°C
2. Magnetization is perpendicular to the film surface
3. Coercivity (room temperature): 600–3000 oersteds
4. Specific Faraday rotation: 40,000–80,000 degrees/cm
5. Optical absorption, 6328–8500 A.: $4-6\times10^5 cm^{-1}$
6. Remanence to saturation ratio: between 90–100 percent The stoichiometric bulk material has a magnetization of 47 emu/gm. The Faraday rotation above and for the remaining examples is for wavelengths in the visible and near infrared regions.

EXAMPLE II

A more preferred working range may be expressed by the formula, again in atomic proportions, of:

$Mn_{0.9-1.1}Ga_{0.9-1.1}Ge_{0.9-1.1}$

Compositions within this formula range exhibit the following properties:

1. Curie point: 150°–190°C
2. Magnetization is perpendicular to the film surface
3. Coercivity (room temperature): 900–3,000 oersteds
4. Specific Faraday Rotation, 50,000–80,000 degrees/cm
5. Optical absorption, 6,328–8,500 A.: 4–6$\times10^5$cm$^{-1}$
6. Remanence to saturation ratio: between 95–100%.

EXAMPLE III:

In particular, we have found the following specific composition of great utility, expressed again in atomic proportions:

$Mn_{1.0}Ga_{1.0}Ge_{1.0}$

This composition has the properties:

1. Curie point: 190°C
2. Magnetization is perpendicular to the film surface
3. Coercivity (room temperature): 2,000 oersteds
4. Specific Faraday Rotation, 80,000 degrees/cm
5. Optical absorption, 6,328–8,500 A.: 5.5$\times10^5$cm$^{-1}$
6. Remanence to saturation ratio: 100%

For this particular composition, the lattice parameters for the tetragonal structure are approximately $a = 4.0$ A. and $c = 5.9$ A. This composition has the highest Tc and Faraday rotation.

EXAMPLE IV:

Another preferred embodiment is expressed in atomic proportions of:

$Mn_{1.0}Ga_{0.95}Ge_{1.0}$

This gallium deficient composition has the properties:

1. Curie point: 112°C
2. Magnetization is perpendicular to the film surface
3. Coercivity (room temperature): 950 oersteds
4. Specific Faraday Rotation, 75,000 degrees/cm
5. Optical absorption, 6,328–8,500 A.: 5.5$\times10^5$cm$^{-1}$
6. Remanence to saturation ratio: 100%

EXAMPLE V

Still another preferred embodiment is expressed by the ternary composition in atomic proportions of:

$Mn_{1.0}Ga_{0.8}Ge_{.95}$

The composition has the properties of:

1. Curie point: 75°C
2. Magnetization is perpendicular to the film surface
3. Coercivity (room temperature): 600 oersteds
4. Specific Faraday Rotation, 40,000 degrees/cm
5. Optical absorption, 6,328–8,500 A.: 4$\times10^5$cm$^{-1}$
6. Remanence to saturation ratio: 90%

In general, these and other compositions have indicated that the following broad relationships exist:

EXAMPLE VI

For a manganese deficient composition, where $Mn_{0.8-0.99}$ Ga Ge, as Mn amount decreases, the coercivity decreases, magnetization decreases, Faraday rotation decreases, and the Curie temperature decreases.

EXAMPLE VII

For a gallium devicient composition, where Mn $Ga_{0.8-0.99}$Ge, as Ga amount decreases, the coercivity decreases, Faraday rotation slightly decreases. This relationship further is true for the broader range of $MnGa_{0.5-0.99}Ge$.

EXAMPLE VIII

For germanium deficient compositions, where $MnGaGe_{0.8-0.99}$, as Ge amount decreases, the coercivity increases, the magnetization decreases, and the Faraday rotation decreases. This relationship is further true for the broader range $MnGaGe_{0.5-0.99}$.

EXAMPLE IX

For manganese excess, $Mn_{1.01-1.2}GaGe$, as Mn amount increases, Faraday rotation decreases, magnetization decreases, and the Curie temperature decreases.

EXAMPLE X

For gallium excess, $MnGa_{1.01-1.2}Ge$, as Ga amount increases, coercivity increases, magnetization decreases, Faraday rotation decreases. This relationship is further true for the broader range $MnGa_{1.01-1.3}Ge$.

EXAMPLE XI

For germanium excess, $MnGaGe_{1.01-1.2}$, as Ge amount increases, coercivity increases, magnetization decreases, and the Curie temperature decreases. This relationship is further true for the broader range $MnGaGe_{1.01-2.3}$.

EXAMPLE XII $Mn_{0.8-1.2}Ga_{0.5-1.3}Ge_{0.6-2.3}$

Compositions having this formula range exhibit the following properties:

1. Curie point: from 75°C to in excess of 190°C
2. Magnetization is perpendicular to the film surface
3. Coercivity (room temperature): 600–5000 oersteds
4. Specific Faraday rotation: 40,000–80,000 degrees/cm
5. Optical absorbtion 6,328–8,500 A.: 4–6$\times10^5$cm$^{-1}$
6. Remanence to saturation ratio: between 50–100%

EXAMPLE XIII $Mn_{1.0}Ga_{0.7}Ge_{1.6}$

Compositions having this formula exhibit the following properties:

1. Curie point: 140°C
2. Magnetization is perpendicular to the film surface
3. Coercivity (room temperature): 3,600 oersteds
4. Specific Faraday rotation: 40,000 degress/cm
5. Optical absorbtion 6,328-8,500 A.: 5$\times10^5$cm$^{-1}$
6. Remanence to saturation ratio: 95%

EXAMPLE XIV:

$Mn_{1.0}Ga_{0.5}Ge_{1.9}$

1. Curie point: $< 200$°C
2. Magnetization is perpendicular to the film surface
3. Coercivity (room temperature): 10,000 oersteds
4. Specific Faraday rotation: $< 60,000$ degrees/cm 5. Optical absorbtion: 4–6×10$^5$cm$^{-1}$
6. Remanence to saturation ratio: 100%

EXAMPLE XV $Mn_{1.0}Ga_{1.10}Ge_{.59}$

1. Curie point: > 190°C
2. Magnetization is perpendicular to the film surface
3. Coercivity (room temperature): 5,000 oersteds
4. Specific Faraday rotation: > 40,000 degrees/cm
5. Optical absorbtion: 4–6×10$^5$cm$^{-1}$
6. Remanence to saturation ratio: 40%

EXAMPLE XVI $Mn_{1.0}Ga_{.98}Ge_{.77}$

1. Curie point: > 190°C
2. Magnetization is perpendicular to the film surface
3. Coercivity (room temperature): 5,000 oersteds
4. Specific Faraday rotation: > 40,000 degrees/cm
5. Optical absorbtion: 4–6×10$^5$cm$^{-1}$
6. Remanence to saturation ratio: 70%

EXAMPLE XVII $Mn_{1.0}Ga_{1.50}Ge_{.73}$

1. Curie point: > 190°C
2. Magnetization is perpendicular to the film surface
3. Coercivity (room temperature): 3,000 oersteds
4. Specific Faraday rotation: > 40,000 degrees/cm
5. Optical Absorbtion: 4–6×10$^5$cm$^{-1}$
6. Remanence to saturation ratio: 70%

EXAMPLE XVIII $Mn_{1.0}Ga_{.84}Ge_{1.69}$

1. Curie point: > 190°C
2. Magnetization is perpendicular to the film surface
3. Coercivity (room temperature): 1,600 oersteds
4. Specific Faraday rotation: > 65,000 degrees/cm
5. Optical absorbtion: 5–6×10$^5$cm$^{-1}$
6. Remanence to saturation ratio: 100%

EXAMPLE XIX $Mn_{1.0}Ga_{.95}Ge_{2.3}$

1. Curie point: < 190°C
2. Magnetization is perpendicular to the film surface
3. Coercivity (room temperature): 1,600 oersteds
4. Specific Faraday rotation: > 65,000
5. Optical absorbtion: 5–6×10$^5$
6. Remanence to saturation ratio: 100%

Over 30 different compositions within the broad ranges above have been made, some of the more interesting ones being listed above. All of these structures are ferromagnetic and crystallize in the tetragonal lattice structure.

It is thus evident that this new composition MnGaGe offers a wide range of room temperature stable ferromagnetic compositions having a Tc as desired as low as 75°C. Further, these compositions may also be controlled to give desired values of Faraday rotation, coercivity and magnetization. These compositions may be made by techniques known to those skilled in the art using readily available equipment. The material cost is low and each material is easily available.

While these representations appear as molecular formulas, the subscripts should be considered to be atomic ratios and not as representing an absolute number of atoms. Thus, the representations $Mn_{0.8}Ga_{0.9}Ge_{1.0}$ designates a composition having the given atomic proportions of each constituent and not a molecule deficient in atoms.

From the known properties of MnGaGe and MnAlGe it would be expected that partial substitution of Al for Ga in MnGaGe would result in the solid solution $MnGa_{1-x}Al_xGe$, with Curie temperatures intermediate between that of MnGaGe (~180°C) and MnAlGe (~245°C). However, when such solid solutions were examined in bulk studies, several unexpected results were obtained. For $x < 0.025$, in the $MnGa_{1-x}Al_xGe$ composition, large and unexpected changes in Curie temperature occur. Instead of being intermediate between the Curie temperatures of MnGaGe and MnAlGe, the Curie temperature of $MnGa_{1-x}Al_xGe$ for $x < 0.025$ is considerably below that of MnGaGe. For instance, $MnGa_{0.975}Al_{0.025}Ge$ has a Curie temperature of 125°C. For those $MnGa_{1-x}Al_xGe$ compositions for which $x > 0.025$ the Curie temperature is greater than 125°C but still less than that of MnGaGe. For instance $MnGa_{0.95}Al_{0.05}Ge$ has a Curie temperature of 142°C, and $MnGa_{0.9}Al_{0.1}Ge$ has a Curie temperature of 159°C.

Furthermore a second unexpected result characterizes the material $MnGa_{0.975}Al_{0.025}Ge$. Material of this composition is unique in that it is monophasic; it contains no free germanium. This is the only bulk composition in the MnGaGe system that is monophasic. This also includes the $MnGa_{1-x}Al_xGe$ compositions for which $x > 0.025$, which are also polyphasic, i.e., they contain free germanium.

The two unexpected results are important because 1) the bulk properties have been shown to be essentially reflected in the properties of thin films of the same composition, 2) it provides an alternative method of lowering Tc without utilizing gross non-stoichiometric compositions as may be done for sputtered and evaporated films of MnGaGe, 3) the ability to prepare stoichiometric, monophasic, low Curie temperature films is particularly important in the epitaxial growth of highly oriented films. The influence of second phases on the epitaxial growth, e.g., free germanium (cubic) or $Mn_5Ge_3$ (hexagonal) is likely to be very negative.

Furthermore a third unexpected result is observed for the composition $MnGa_{0.975}Al_{0.025}Ge$. The bulk material of this composition can be annealed at 575°C without deterioration. Bulk MnGaGe itself if annealed above 500°C precipitates free germanium from the lattice. This discovery is important to the production of films by sputtering, because sputtering targets must be fabricated from pre-reacted material as free Ga is a liquid above 29°C. The higher annealing temperature which can be used for $MnGa_{0.975}Al_{0.025}Ge$ significantly reduces the required annealing time to prepare the bulk materials. This higher annealing temperature also allows the use of higher sintering temperatures for target fabrication resulting in much denser targets than can be obtained at lower sintering temperatures. Denser targets are mechanically stronger and can therefore be handled more conveniently and also have a higher thermal conductivity which helps to prevent fractionation near the target surface where very high temperatures can occur if the thermal conductivity of the target is low.

Films with very nearly the composition $MnGa_{0.0\text{-}75}Al_{0.025}Ge$ were prepared by sputtering. These films have a Curie temperature of 120°C and do not contain any free germanium or any other unwanted phases.

These films do not require higher processing temperatures than films without Al substitution. The magnetic characteristics (except for Curie temperature) of these films is similar to those in films without Al substitution.

Where Al > 0.025, it may be added to the limit of solid solubility of Al in MnGaGe. Al in excess of 10 percent has already been added to MnGaGe with the effect noted on the Curie temperature, while still maintaining a single phase tetragonal structure. Other Group III elements in addition to Al may be expected to have a similar effect. These include boron, indium and thallium.

In describing MnGaGe materials, it is evident that other substitutions may be made for Mn, Ga or Ge to affect certain properties without effecting the fundamental invention, MnGaGe as a ferromagnetic material. These substitutions can clearly be made while still remaining within the basic concepts of this invention. Thus, the phraseology "consisting essentially of MnGaGe" in its various modifications is meant to include such substitutions as well as trace impurities having no substantial effect upon the material.

For example, the first series transition metals may be added to the basic MnGaGe material to affect its properties while still maintaining the basic MnGaGe structure. These transition metals include iron, cobalt, nickel and copper, and titanium, vanadium and chromium.

Example A $Mn_{0.95}Fe_{0.05}GaGe$

1. Curie point: 103°C
2. Bulk saturation magnetization: 31.1 emu/gm
3. Tetragonal lattice parameters:
   $a = 3.975$; $c = 5.869$ The other magnetic and optical properties of this composition and those following are similar to that of unsubstituted MnGaGe. The primary effect of these additions is to affect the Curie point and saturation magnetization of the basic material.

Example B:

$Mn_{0.95}Co_{0.05}GaGe$

1. Curie point: 97°C
2. Bulk saturation magnetization: 28.4 emu/gm
3. Tetragonal lattice parameters
   $a = 3.975$ ; $c = 5.862$

EXAMPLE C:

$Mn_{0.95}Ni_{0.05}GaGe$

1. Curie point: 105°C
2. Bulk saturation magnetization: 28.6 emu/gm
3. Tetragonal lattice parameters:
   $a = 3.969$ ; $c = 5.863$ Example D $Mn_{0.95}Cu_{0.05}GaGe$ 1. Curie point: 126°C
2. Bulk saturation magnetization: 31.0 emu/gm
3. Tetragonal lattuce structure:
   $a = 3.972$ ; $c = 5.888$ Example E $Mn_{0.95}Ti_{0.05}GaGe$ 1. Curie point: 162°C
2. Bulk saturation magnetization: 35.6 emu/gm
3. Tetragonal lattice structure:
   $a = 3.967$ ; $c = 5.899$ Example F $Mn_{0.95}V_{0.05}GaGe$ 1. Curie point: 155°C
2. Bulk saturation magnetization: 37.8 emu/gm
3. Tetragonal lattice structure:
   $a = 3.970$ ; $c = 5.900$ Example G $Mn_{0.95}Cr_{0.05}GaGe$ 1. Curie point: -') 163°C
2. Bulk saturation magnetization: 37.2 emu/gm
3. Tetragonal lattice structure:
   $a = 3.970$ ; $c = 5.890$ In general, the transition metal substitutions may be expressed as $Mn_{1-x}M_xGaGe$ where M is a transition metal chosen from the group consisting of Fe, Ni, Co, Cu, Cr, V, Ti and X in a preferred embodiment is 0.05. The preferred range of substitution, or the range for X, is between X> a small but essential amount to affect the Curie point of MnGaGe by at least 3°C, and X the amount to remain within the tetragonal MnGaGe structure. Most preferably, 0.01 <$x$ .10. More basically, 0<$x$ limit of solid solubility of M in the tetragonal MnGaGe structure, as in the case of aluminum.

While these examples, as well as the prior example showing the use of aluminum, maintain stoichiometric amounts of Ga and Ge, it is evident to those skilled in the art that variations from stoichiometry may be made in any or all of the Mn, Ga or Ge separately or jointly as desired to suit desired properties while still maintaining the basic concept of this invention. Further, one skilled in the art may add more than one substitution element for Mn, Ga or Ge at one time — such as Fe and Ni simultaneously, for Mn, or Al and indium simultaneously for Ga or silicon and tin simultaneously for Ge — to affect the Curie point and magnetic properties while still maintaining the basic concept of this invention. Thus all of the modifications modify MnGaGe being a new ferromagnetic material having a tetragonal structure. More broadly, one may generalize $$Mn_{1-x}M_xGa_{1-y}K_yGe_{1-z}G_z$$

where X is chosen from the group consisting of Cr, Ti, V, Fe, Ni, Co, Cu,

Y is chosen from the group consisting of B, Al, In, Ti and

Z is chosen from the group consisting of Si and Sn, and further where the sum of X, Y and Z is such as to remain within the tetragonal structure of the basic MnGaGe, or in other words, to the limit of solid solubility in tetragonal MnGaGe. It is evident that the number of combinations is so vast that it is not possible to put an actual percent limit on the combinations for X, Y and Z, other than remaining within the tetragonal MnGaGe structure.

In the substitution of these elements for Mn, Ga and/or Ge as the case may be, it is recognized that replacement of gallium by aluminum for example in $MnAl_{0.025}Ga_{0.975}Ge$ does not necessarily imply that the aluminum is necessarily situated totally on gallium sites, but may be present for instance on Mn sites as well, causing Mn to occupy some gallium sites. Other substitutions may lead to a similar disorder. Nonetheless the basic formula is descriptive of the substitution that occurs.

These magnetic compositions in film form are particularly useful for data storage applications, such as in a beam addressable file wherein a polarized beam of light is directed toward the magnetic media and the degree of rotation of the polarization of the beam from the area addressed indicates the state of magnetization of that area. The Faraday effect in transmission, or Kerr effect in reflection, may be used. For such a memory application, a film of MnGaGe in the preferred proportions listed above is deposited upon a non-magnetic substrate. The substrate may be transparent as may be the film, for the particular wavelength used, or it may be opaque for reflection techniques. Thus, the substrate may typically be of aluminum or other metals, of a ceramic, or glass. Film thickness is between 300–10,000 A. The film substrate structure may be in disk form, strip form, drum form or other forms known in the art. Film deposition is by methods known in the art, and discussed previously.

While specific preferred embodiments and ranges in atomic proportions have been shown, those skilled in the art will be aware of other specific ratios suitable for particular purposes still within the scope of this invention.

What is claimed is:

1. A ferromagnetic composition consisting essentially of a ternary compound having atomic proportions indicated by the formula $Mn_{0.8-1.2}Ga_{0.5-1.3}Ge_{0.6-2.3}$.

2. A ferromagnetic composition consisting essentially of a ternary compound having atomic proportions indicated by the formula $Mn_{0.8-1.2}Ga_{0.8-1.2}Ge_{0.8-1.2}$.

3. A ferromagnetic composition consisting essentially of a ternary compound having atomic proportions indicated by the formula $Mn_{0.9-1.9}Ga_{0.9-1.1}Ge_{0.9-1.1}$.

4. A ferromagnetic composition consisting essentially of a ternary compound having atomic proportions indicated by the formula $Mn_{1.0}Ga_{1.0}Ge_{1.0}$.

5. A ferromagnetic composition consisting essentially of a ternary compound having atomic properties indicated by the formula $Mn_{1.0}Ga_{0.95}Ge_{1.0}$.

6. A ferromagnetic composition consisting essentially of a ternary compound having atomic properties indicated by the formula $Mn_{1.0}Ga_{0.8}Ge_{0.95}$.

7. A ferromagnetic composition consisting essentially of a ternary compound having atomic properties indicated by the formula $Mn_{1.0}Ga_{.74}Ge_{1.6}$.

8. A ferromagnetic composition consisting essentially of a ternary compound having atomic properties indicated by the formula $Mn_{1.0}Ga_{0.95}Ge_{2.3}$.

9. A ferromagnetic composition consisting essentially of the elements manganese, germanium and gallium, and having a tetragonal structure.

10. A ferromagnetic composition consisting essentially of a ternary compound having atomic proportions indicated by the formula $Mn_{0.8-1.2}Ga_{0.5-1.3}Ge_{0.6-1.9}$.

11. A data storage medium comprising a magnetic film upon a non-magnetic substrate, the magnetic film consisting essentially of a ternary compound having atomic properties indicated by the formula $MnGa_{1-x}M_xGe$ where $0<x$ limit of solid solubility of M in the ternary tetragonal MnGaGe structure, and M is chosen from the group consisting of Al, In, B, Tl.

12. The data storage medium of claim 11 wherein the substrate is a non-magnetic metal.

13. The data storage medium of claim 11 wherein the substrate is a glass material.

14. The data storage medium of claim 11 wherein the substrate is a ceramic material.

15. A ferromagnetic composition of matter consisting essentially of the composition in atomic proportions of $MnGa_{1-x}M_xGe$ where $0<x$ limit of solid solubility of M in the ternary tetragonal MnGaGe structure, and M is chosen from the group consisting of B, Al, In, Tl.

16. The composition of claim 15 wherein X 0.025.

17. A data storage medium comprising a magnetic film upon a non-magnetic substrate, the magnetic film consisting essentially of the elements manganese, germanium and gallium, and having a tetragonal structure.

18. The magnetic film of claim 17 wherein the composition is $Mn_{0.8-1.2}Ga_{0.5-1.3}$Ge0.6–2.3.

19. The data storage medium of claim 17 wherein the substrate is a non-magnetic metal.

20. The data storage medium of claim 17 wherein the substrate is a glass material.

21. The data storage medium of claim 17 wherein the substrate is a ceramic material.

22. The magnetic film of claim 17 including the addition of a Group III element chosen from the group consisting of aluminum, indium, thallium, and boron.

* * * * *

PO-1050
(5/69)

UNITED STATES PATENT OFFICE
CERTIFICATE OF CORRECTION

Patent No. 3,770,395 Dated 11/6/73

Inventor(s) E. Sawatzky and B. Street

It is certified that error appears in the above-identified patent and that said Letters Patent are hereby corrected as shown below:

In col. 8, line 27, after <x, add -- ≤ --.

line 28, after 0<x, add -- ≤ --.

In col. 10, line 15, after 0<x, add -- ≤ --.

line 26, after 0<x, add -- ≤ --.

line 36, change "$Mn_{0.8-1.2}Ga_{0.5-1.3}Ge0.6\_2.3$" to

--$Mn_{0.8-1.2}Ga_{0.5-1.3}Ge_{0.6-2.3}$ --.

Signed and sealed this 21st day of May 1974.

(SEAL)
Attest:

EDWARD M.FLETCHER,JR.
Attesting Officer

C. MARSHALL DANN
Commissioner of Patents